US006594678B1

(12) United States Patent
Stoutamire et al.

(10) Patent No.: US 6,594,678 B1
(45) Date of Patent: Jul. 15, 2003

(54) METHODS AND APPARATUS FOR IMPROVING LOCALITY OF REFERENCE THROUGH MEMORY MANAGEMENT

(75) Inventors: David P. Stoutamire, San Juan Bautista, CA (US); Steffen Grarup, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 279 days.

(21) Appl. No.: 09/618,981

(22) Filed: Jul. 19, 2000

Related U.S. Application Data

(60) Provisional application No. 60/174,744, filed on Jan. 5, 2000.

(51) Int. Cl.[7] .............................................. G06F 17/30
(52) U.S. Cl. ........................... 707/206; 707/7; 707/200
(58) Field of Search .......................... 707/102, 2, 103, 707/101, 100, 206, 205, 7, 200

(56) References Cited

U.S. PATENT DOCUMENTS 6,209,066 B1 * 3/2001 Holzle et al. ................ 711/153
6,321,240 B1 * 11/2001 Chilimbi et al. ............ 707/102
6,330,556 B1 * 12/2001 Chilimbi et al. ................ 707/2

OTHER PUBLICATIONS

Chilimbi, TM, et al.: "Cache–Conscious Structure Definition", ACM SIGPLAN Notices, US, Association For Computing Machinery, New York, vol. 34, No. 5, May 1999, pp13–24, XP000832667, ISSN: 0362–1340. .

Chilimbi, TM, et al.: "Using Generational Garbage Collection To Implement Cache–Conscious Data Placement", ISMM '98. International Symposium On Memory Management, Vancouver, BC, Canada, vol. 34, No. 3, Oct. 17–19, 1998, pp. 37–48, XP000993595, SIGPLAN Notices, Mar. 1999, ACM, USA ISSN: 0362–1340.

Chilimbi, TM, et al.: "Cache–Conscious Structure Layout", ACM SIGPLAN Notices, US, Association for Computing Machinery, New York, vol. 34, No. 5, May 1999, pp. 1–12, XP000832666, ISSN: 0362–1340.

Calder, B., et al.: "Cache–Conscious Data Placement", ACM SIGPLAN Notices, US, Association for Computing Machinery, New York, vol. 33, No. 11, Nov. 1, 1998, pp. 139–149, XP000787304, ISSN: 0362–1340.

* cited by examiner

*Primary Examiner*—Sanjiv Shah
(74) *Attorney, Agent, or Firm*—Beyer Weaver & Thomas, LLP

(57) ABSTRACT

Methods and apparatus for creating a mechanism for rearranging a plurality of objects in memory are disclosed. A frequency of accesses in memory of one or more fields associated with the plurality of objects with respect to one another during execution of a computer application are determined. A mechanism for rearranging the plurality of objects in the memory in accordance with the determined frequency of accesses in memory of data referenced by the one or more fields associated with the plurality of objects with respect to one another is then generated.

26 Claims, 19 Drawing Sheets

MARK AND SWEEP - 1ST PASS

MARK AND SWEEP - 2ND PASS

COPYING CARBAGE COLLECTION

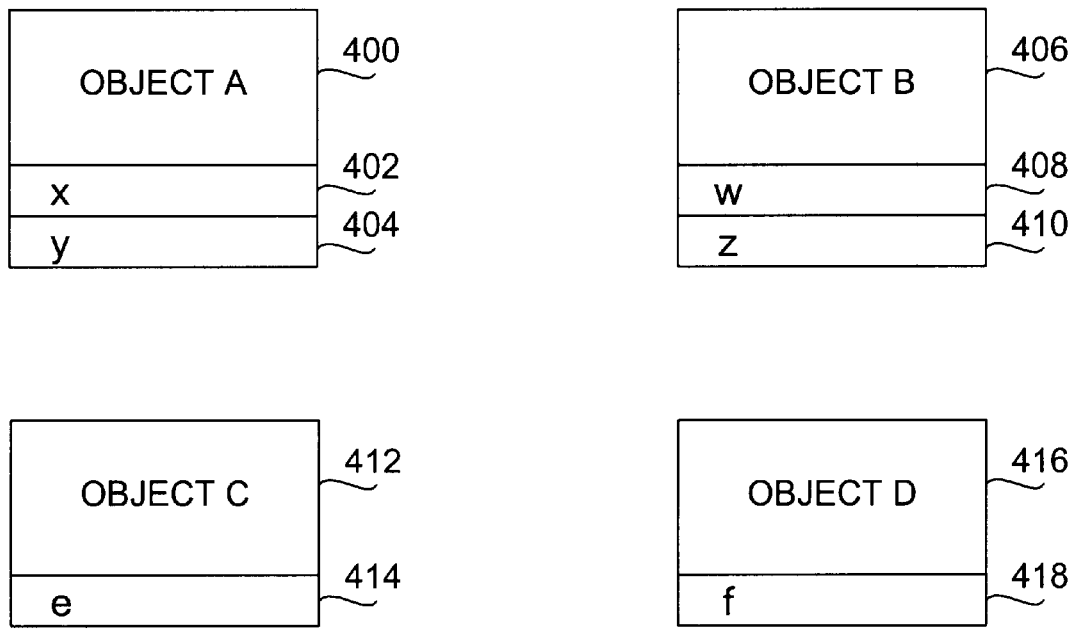
FIG. 4A
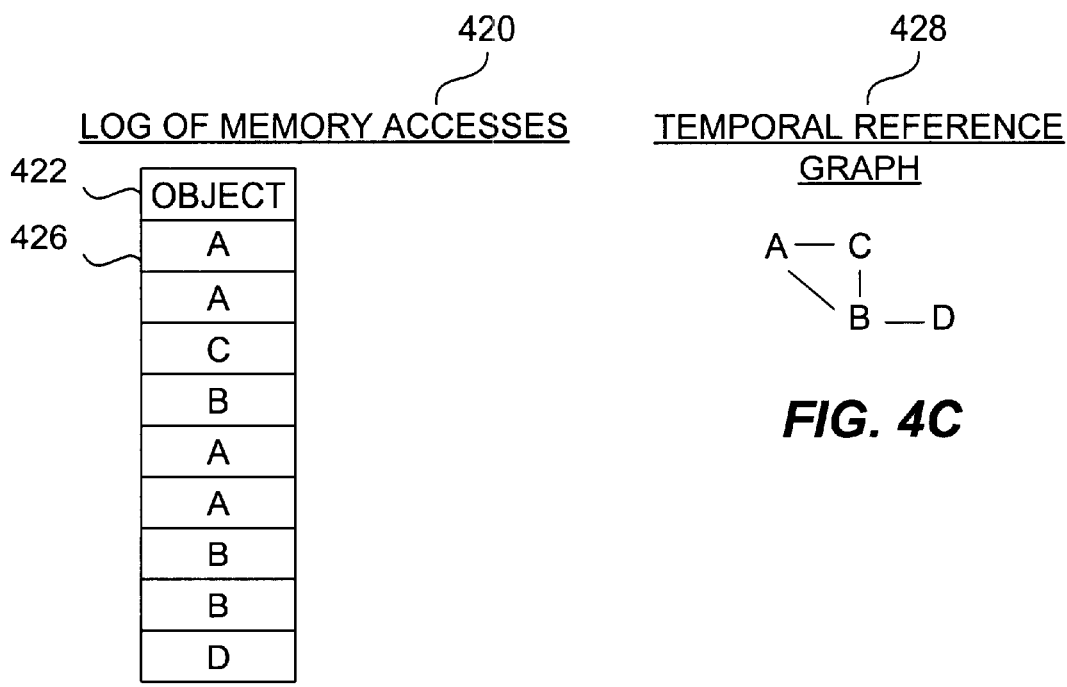
FIG. 4B
FIG. 4C

LOG OF MEMORY ACESSES ⌒514

| OBJECT | FIELD |
|---|---|
| A | X |
| A | Y |
| A | X |
| A | Y |

TEMPORAL REFERENCE ⌒524
GRAPH

X — Y

PATH PROFILE

FIELDS SORTED PER CLASS

METHODS AND APPARATUS FOR IMPROVING LOCALITY OF REFERENCE THROUGH MEMORY MANAGEMENT

CROSS-REFERENCE TO RELATED APPLICATIONS

This application claims priority of U.S. Provisional Application No. 60/174,744 filed on Jan. 5, 2000 and entitled "METHODS AND APPARATUS FOR IMPROVING LOCALITY OF REFERENCE THROUGH MEMORY MANAGEMENT," which is hereby incorporated by reference.

BACKGROUND OF THE INVENTION

1. Field of the Invention

The present invention relates generally to computer software. More particularly, the present invention relates to improving the placement of data in memory to increase the speed with which the data may be accessed.

2. Discussion of Related Art

Cache memory is often used in conjunction with a main memory to provide an increased memory speed. Typically, portions of data are copied from the main memory so that the cache contains a copy of these portions of main memory. When the CPU attempts to read a word, a check is made to determine if the word is in the cache. If the word is in the cache, the word is read from the cache. Otherwise, a number of words are read from the main memory to be stored in the cache and the word is provided to the CPU.

When a word is not in the cache, it must be read from main memory, which increases memory access time. In order to increase the probability that requested data is present in the cache, caches typically use heuristics to guess which data will be accessed and copy this data into the cache. Thus, computer memory systems often rely on caches to keep the most frequently accessed items close to processors.

Since multiple words are simultaneously stored in the cache, the placement of data in memory can affect the efficiency of caches, thereby affecting the overall speed at which a computer system operates. It is therefore important to efficiently lay out data (e.g., objects) in memory to maximize speed. Previously proposed techniques have large overheads or cannot be used in a dynamic environment such as that executing Java bytecodes.

In order to eliminate objects that are no longer referenced from memory, garbage collection is often performed. Two commonly used methods of performing garbage collection are the "mark and sweep" method and the "copying garbage collection" method. As will be described in further detail below, the relocation of data in memory may be performed to some degree during the garbage collection process.

FIG. 1A is an exemplary block diagram illustrating the placement of objects in memory during a conventional mark and sweep garbage collection process. As shown in FIG. 1A, objects 102, 104, 106, and 108 are illustrated. More particularly, the object 102 references both the objects 104 and 106, and is referenced by a thread of execution. Mark and sweep garbage collection is typically performed in two passes. During the first pass, each object that is not referenced by any objects is marked. For instance, object 108 is not referenced by any of the objects 102, 104, or 106 and is therefore marked for deletion. During the second pass, the memory for each object that is not marked is reclaimed.

FIG. 1B is a block diagram illustrating the memory of FIG. 1A upon completion of a conventional mark and sweep garbage collection process. As shown, the object 108, marked in FIG. 1A, is deleted and therefore not shown in FIG. 1B. The objects 102, 104, and 106 remain after completion of the garbage collection process. It is important to note that objects are not usually relocated during mark and sweep garbage collection.

Another method of garbage collection, copying garbage collection, is also commonly used. FIG. 2A is an exemplary block diagram illustrating objects in memory during a conventional copying garbage collection process. As shown, within memory 200 are multiple objects. For instance, a first object 202, "A", a second object 204, "B", and a third object 206, "D", are stored in memory and all are reachable from a root. In addition, a fourth object 208, "C", is stored in the memory 200 but is not referenced by any other objects in memory.

FIG. 2B is a block diagram illustrating the memory of FIG. 2A upon completion of a conventional copying garbage collection process. During copying garbage collection, all objects that are referenced by one or more objects are copied while those objects that are not referenced by any other objects are not copied. Thus, all objects that are not copied are garbage. For instance, as shown in FIG. 2B, the fourth object 208, "C", is not copied. Once copied, the memory for the original objects shown in FIG. 2A may then be reclaimed.

During copying garbage collection, the objects may be placed in various orders during the copying process. FIG. 3A is a block diagram illustrating an exemplary configuration of objects in memory. As shown, a memory 300 stores a first object 302, "A", a second object 304, "B", a third object 306, "D". The first object 302 references both the second object 304 and the third object 306. A fourth object 308, "C", is referenced by none of the objects.

Since the first object 302 references both the second and third objects 304 and 306, the objects may be placed in two different orders. FIG. 3B is a block diagram illustrating one possible configuration of the objects of FIG. 3A upon completion of copying garbage collection. As shown, the second object 304 may be placed adjacent to the first object 302 while the third object 306 may be placed adjacent to the second object 304.

FIG. 3C is a block diagram illustrating another possible configuration of the objects of FIG. 3A upon completion of copying garbage collection. As shown, rather than placing the second object 304 adjacent to the first object 302, the third object 306 is placed adjacent to the first object 302. In the simplified examples illustrated in FIG. 3B and FIG. 3C, the objects may be placed in two different orders. It would be beneficial if a mechanism were designed to enable the objects to be ordered while maximizing the speed of access of the objects in memory.

In object-oriented programming, code and data are merged into objects. Each object is defined via its class, which determines the properties of an object. In other words, objects are individual instances of a class. Moreover, each object may include various fields as well as methods.

As disclosed in the article entitled "Using Generational Garbage Collection To Implement Cache-Conscious Data Placement" by Trishul M. Chilimbi and James R. Larus, which appeared in International Symposium on Memory Management (ISMM '98), October, 1998, objects accessed closely together in time may be stored in memory so that they will be fetched in the same cache line. The process disclosed in Chilimbi will be briefly described with reference to FIGS. 4A, 4B, and 4C. FIG. 4A is a block diagram illustrating an exemplary set of objects stored in memory and associated fields. As shown, a first object 400, "A", includes a first field 402, "x", and a second field 404, "y". Similarly, a second object 406, "B", includes a first field 408, "w", and a second field 410, "z". A third object 412, "C", includes a field 414, "e", and a fourth object 416, "D", includes a field 418, "f".

FIG. 4B is a block diagram illustrating an exemplary log of memory accesses that may be produced during the execution of a computer application accessing the objects and fields shown in FIG. 4A. In Chilimbi, a computer application is instrumented such that memory references (e.g., load and store commands) are logged. When the instrumented computer application is executed, a log of memory accesses 420 is produced. More specifically, an object 422 is logged for each memory access. For instance, when a field (e.g., the first field 402) of the first object 400, "A", is fetched from memory, this memory access is logged as shown in entry 426.

The memory access log is then used to create a temporal reference graph modeling the reference locality between objects. FIG. 4C is an exemplary temporal reference graph illustrating the accesses of objects in memory and the temporal relationships of these memory accesses that may be produced from the log of memory accesses shown in FIG. 4B. As shown in temporal reference graph 428, accesses of the objects are placed in the graph according to the temporal relationships of the memory accesses shown in the log of memory accesses 420. The temporal reference graph 428 may then be used to achieve the proper placement of objects so that those objects that are accessed closely in time are placed in close proximity to one another. More particularly, the temporal reference graph 428 is used to guide the order in which the objects are copied during copying garbage collection. However, it is important to note that Chilimbi ignores the specific field accessed within the corresponding memory accesses. Moreover, since the creation of the log requires substantial overhead for every memory reference, the creation of this log requires time and memory resources.

Although Chilimbi discloses reordering objects in memory, the specific fields accessed within these objects is ignored. Although Chilimbi ignores the accesses of the fields, the reordering of fields within a single object has been contemplated and will be described with reference to FIG. 5A, FIG. 5B, and FIG. 5C.

FIG. 5A is a block diagram illustrating an exemplary set of objects stored in memory and associated fields. As shown, a first object 500, "A", has a first field 502, "y", a second field 504, "x", and a third field 506, "v". In addition, a second object 508, "B", has a first field 510, "z", and a second field 512, "w".

FIG. 5B is a block diagram illustrating an exemplary log of memory accesses that may be produced during the execution of a computer application accessing the objects and fields shown in FIG. 5A. A log of memory accesses 514 in which each object 516 and associated field 518 accessed in memory are identified and logged. For instance, as shown, when the second field 504, "x", is accessed in the first object 500, "A", the object accessed 520, "A", and the field accessed 522, "x", are logged.

Once the log of memory accesses is created, the log is then used to determine the temporal relationship between the logged memory accesses. A temporal reference graph modeling the reference locality between objects is then created. FIG. 5C is an exemplary temporal reference graph 524 illustrating the temporal relationship between the field references shown in the log of FIG. 5B. Rather than illustrating the relationship between the objects accessed, the graph 524 illustrates the relationship between the fields accessed. As shown, the first and second fields 502 and 504, x and y, of the first object 500, A are graphed. The temporal reference graph 524 is then used to reorder the fields x and y within the object A. As shown, the temporal reference graph 524 indicates that the order of the fields x and y with respect to one another is irrelevant. However, the storage of the third field 506, v, should not interfere with the storage of x and y so that x and y are in close proximity to one another. In this manner, fields within a particular object may be reordered. Although fields have been reordered within a single object, field accesses have not been analyzed to reorder the objects those fields reference.

Rather than instrumenting each memory reference, it is possible to instrument the paths of control flow encountered by an executing program through path profiling. FIG. 6A is an exemplary block diagram illustrating all possible paths during execution of a computer application. In this example, each block represents one or more computer instructions. Block 600 is executed prior to conditional statement 602. For instance, the conditional statement 602 may be an if-then-else statement. There are two branches that may be executed depending upon the result of the if-then-else statement. The first branch includes blocks 604 and 606. The second branch includes blocks 608 and 610.

When path profiling is performed, the paths of control flow are instrumented. FIG. 6B is a diagram illustrating an exemplary path profile illustrating the possible paths associated with the computer application of FIG. 6A. As shown, rather than instrumenting each load and store command as performed in Chilimbi, code is inserted at decision points as shown at block 612. Since the paths of control flow are instrumented, path profiling can determine how often each branch (i.e., path) is taken. Thus, path profiling is advantageous since it requires less overhead than instrumenting each load and store command within each path.

In view of the above, it would be desirable if objects in memory could be reordered through a process such as copying garbage collection to maximize the speed with which the fields of the objects may be accessed. Moreover, it would be beneficial if the frequency and proximity of accesses of the fields of the objects could be analyzed with reduced overhead using a process such as path profiling to determine the order in which the objects are to be copied.

SUMMARY

The present invention generates a mechanism for reordering objects in memory in accordance with information obtained in relation to accesses of fields of the objects from memory. For instance, this may be accomplished through modifying the order of traversal of fields during copying garbage collection. In this manner, objects may be ordered in memory to minimize the speed with which the objects are later retrieved from memory.

According to one aspect of the present invention, a mechanism for rearranging a plurality of objects in memory is created. A frequency of accesses in memory of one or more fields associated with the plurality of objects with respect to one another during execution of a computer application are determined. A mechanism for rearranging the plurality of objects in the memory in accordance with the determined frequency of accesses in memory of the one or more fields associated with the plurality of objects with respect to one another is then generated.

According to one aspect of the invention, the mechanism that is generated includes garbage collection code for rearranging the plurality of objects during garbage collection. Garbage collection may be implemented in a variety of ways. For instance, copying garbage collection or some variation of copying garbage collection may be performed.

According to yet another aspect of the invention, a mechanism for reordering objects in memory may be created from information that indicates frequency and proximity of field references across all instances of a single class. According to one embodiment, a mechanism for modifying the order in which fields of objects are visited during garbage collection is created. First, field reference information is obtained for all instances of a class, where the field reference information indicates frequency and proximity of references of objects referenced to by fields of the class with respect to one another. A class field order is then determined from the associated field reference information, where the class field order identifies an order in which fields of the class are to be traversed during garbage collection. The process may be repeated for multiple classes such that the class field order is associated with each corresponding class.

According to another aspect of the invention, garbage collection is performed using the reordering mechanism. According to one embodiment, an object is identified and a class associated with the object is ascertained. A class field order associated with the class of the object is determined, where the class field order identifies an order in which fields of the class of the object are to be traversed during garbage collection. The fields of the object are then visited during garbage collection (e.g., copying garbage collection) in accordance with the class field order associated with the class of the object. For instance, for each field visited, each object pointed to directly or indirectly may be copied.

The present invention enables objects to be reordered in accordance with information that indicates proximity and frequency of references of fields of the objects in memory. In this manner, those objects referenced by these fields may be reordered in memory during garbage collection. Thus, objects accessed closely in time to one another may be stored in close proximity in memory. This is particularly advantageous in those systems implementing a cache, since this increases the probability that the objects will be retrieved and stored in the same cache line. Accordingly, the time to retrieve objects accessed in close proximity to one another may be dramatically decreased.

BRIEF DESCRIPTION OF THE DRAWINGS

The invention, together with further advantages thereof, may best be understood by reference to the following description taken in conjunction with the accompanying drawings in which:

FIG. 4A is a block diagram illustrating an exemplary set of objects stored in memory and associated fields.

FIG. 4B is a block diagram illustrating an exemplary log of memory accesses that may be produced during the execution of a computer application accessing the objects and fields shown in FIG. 4A.

FIG. 4C is an exemplary temporal reference graph illustrating the accesses of objects in memory and the temporal relationships of these memory accesses that may be produced from the log of memory accesses shown in FIG. 4B.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The present invention enables objects to be reordered in memory according to the frequency with which other objects referred to by the fields of the objects are referenced. According to one embodiment, this is accomplished by generalizing across all instances of a given class the frequency of the references (e.g., memory accesses) of fields of that class.

In addition, according to one embodiment, path profiling is utilized. Profiles may be taken for a short period of time, for example during interpretation of a Java program, and then removed from compiled code with little overhead during runtime. In this manner, objects may be reordered without requiring a large amount of time and memory.

A copying garbage collector may choose a variety of orders to place objects in memory. According to one embodiment, those objects that will be accessed closely in time by the application are clustered on the same cache lines through a copying garbage collection process.

Rather than examining the frequency of field references with respect to each object of a given class, the present invention generalizes the frequency of field accesses (i.e., field references) across all instances of a given class according to one embodiment. Since objects of a given class are often used for the same purpose, the behavior of these objects is often substantially identical. Thus, the memory accesses performed with respect to multiple instances of a single class are often substantially identical. This phenomenon will be described in further detail with reference to FIGS. 7A through 7C.

Figure 1A:
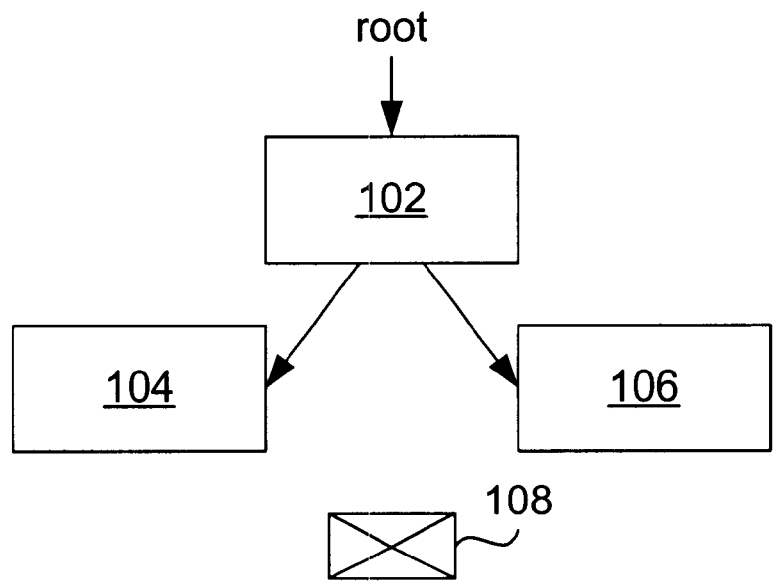
FIG. 1A is an exemplary block diagram illustrating the placement of objects in memory during a conventional mark and sweep garbage collection process.
Figure 1B:
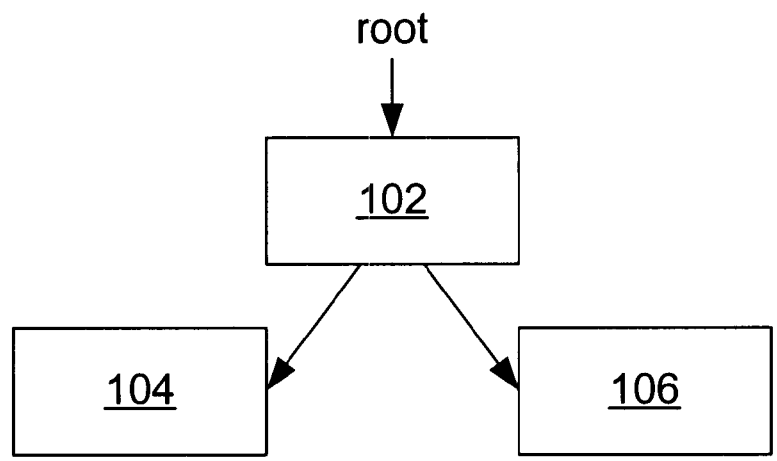
FIG. 1B is a block diagram illustrating the memory of FIG. 1A upon completion of a conventional mark and sweep garbage collection process.
Figure 2A:
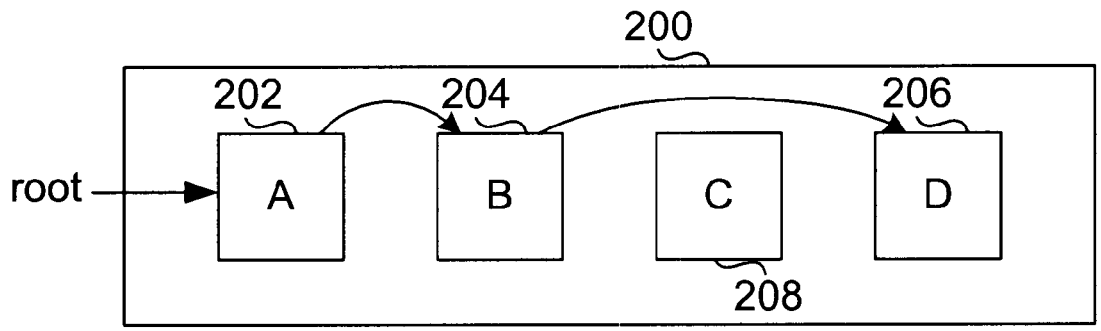
FIG. 2A is an exemplary block diagram illustrating objects in memory during a conventional copying garbage collection process.
Figure 2B:
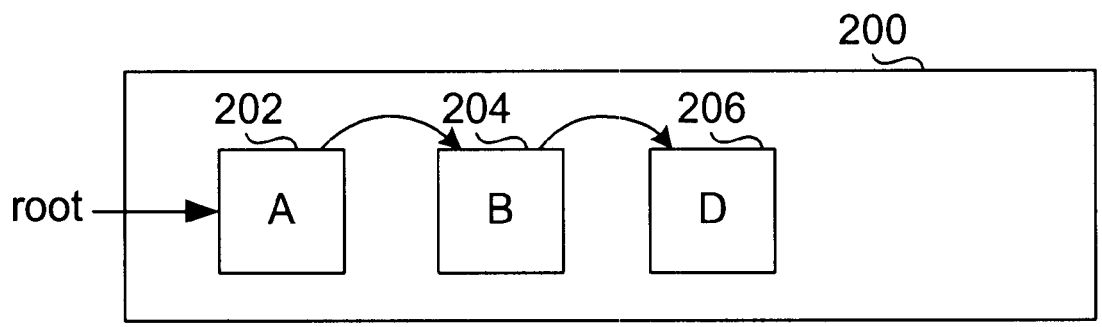
FIG. 2B is a block diagram illustrating the memory of FIG. 2A upon completion of a conventional copying garbage collection process.
Figure 3A:
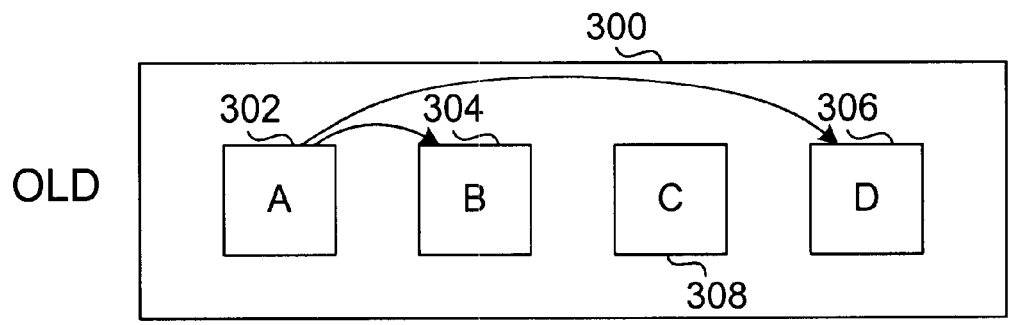
FIG. 3A is a block diagram illustrating an exemplary configuration of objects in memory.
Figure 3B:
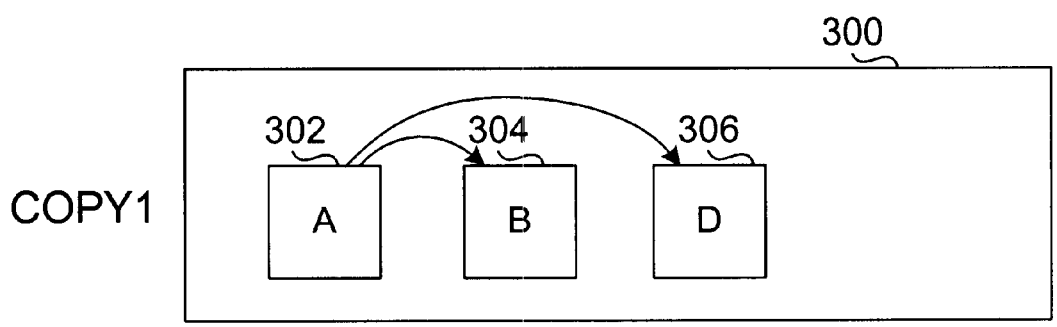
FIG. 3B is a block diagram illustrating one possible configuration of the objects of FIG. 3A upon completion of copying garbage collection.
Figure 3C:
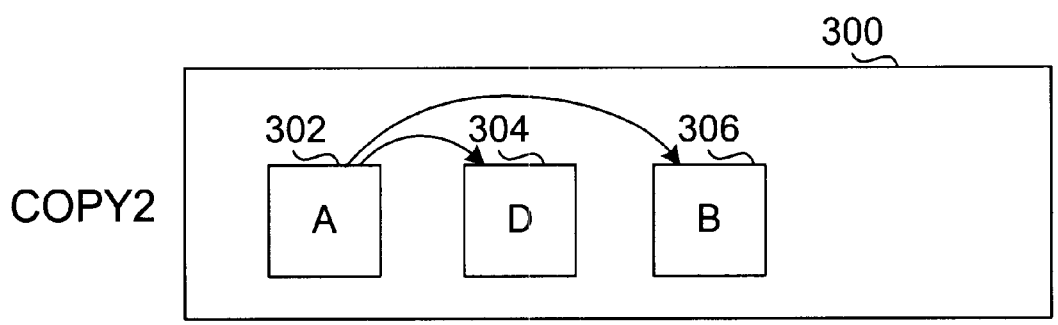
FIG. 3C is a block diagram illustrating another possible configuration of the objects of FIG. 3A upon completion of copying garbage collection.
Figures 5A, 5B, 5C:
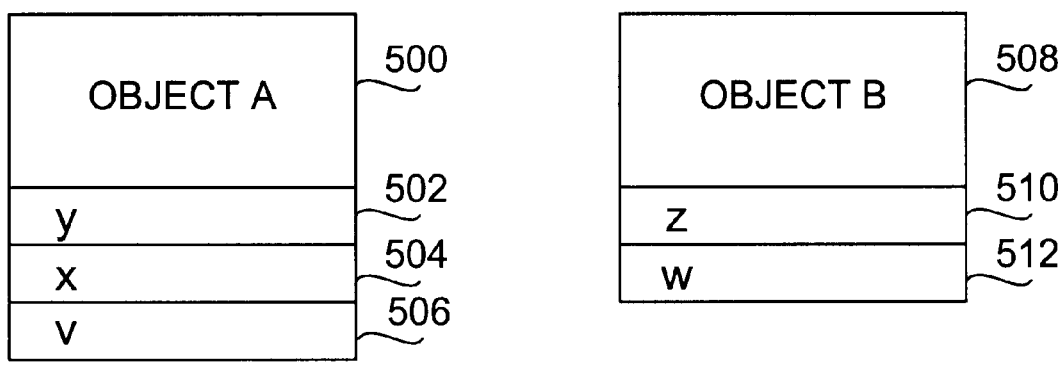
FIG. 5A is a block diagram illustrating an exemplary set of objects stored in memory and associated fields.
FIG. 5B is a block diagram illustrating an exemplary log of memory accesses that may be produced during the execution of a computer application accessing the objects and fields shown in FIG. 5A.
FIG. 5C is an exemplary temporal reference graph illustrating the temporal relationship between the field references shown in the log of FIG. 5B.
Figure 6A:
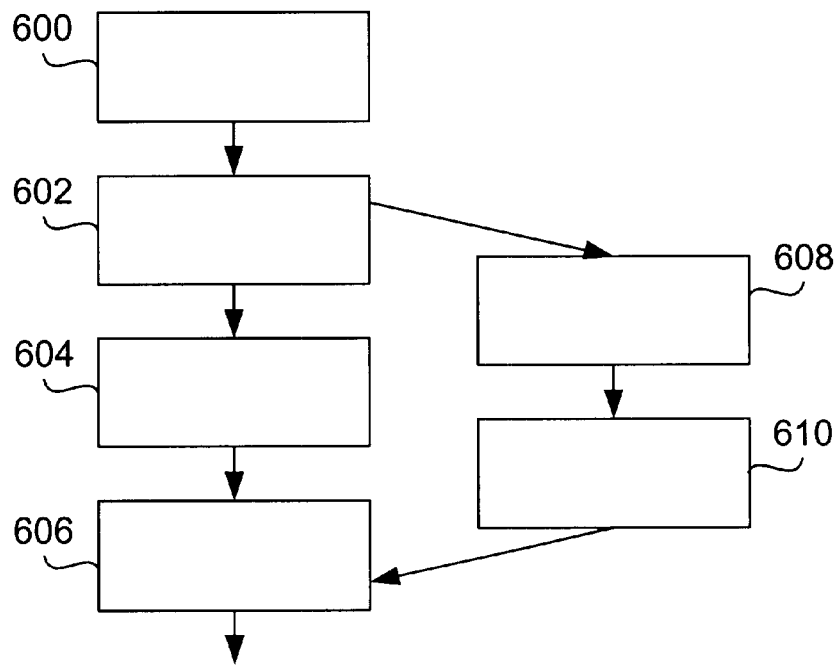
FIG. 6A is an exemplary block diagram illustrating all possible paths during execution of a computer application.
Figure 6B:
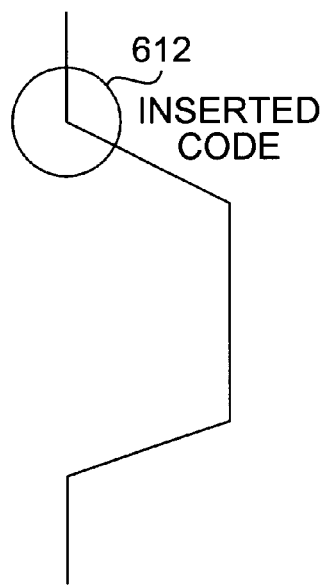
FIG. 6B is a diagram illustrating an exemplary path profile illustrating the possible paths associated with the computer application of FIG. 6A.
Figure 7A:
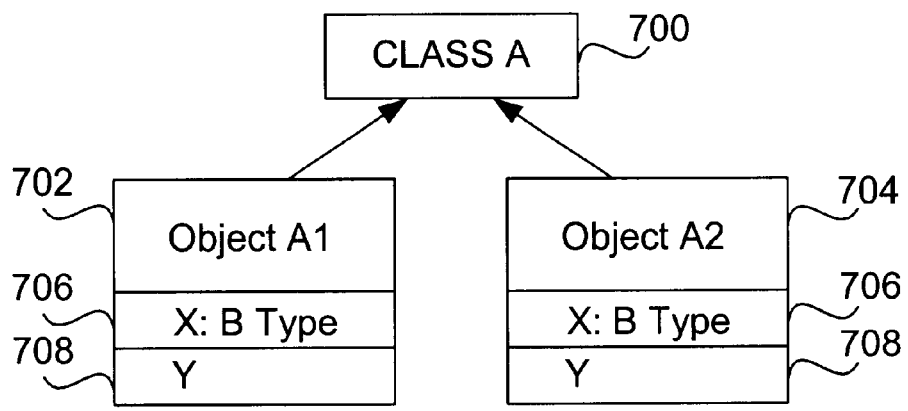
FIG. 7A is a block diagram illustrating an exemplary set of instances of a single class "A".

FIG. 7A is a block diagram illustrating an exemplary set of instances of a single class 700, A. A first instance 702, object A1, and a second instance 704, object A2, both have a first field 706, x, and a second field 708, y. Thus, multiple instances of a single class will have the same fields and therefore have fields of the same type.

Since instances of the same class have the same fields, these instances will likely be used in the same circumstances. For instance, these objects will often be used in the same data structures and therefore memory accesses with respect to the fields of these objects will occur at substantially the same frequencies and orders.

Figure 7B:
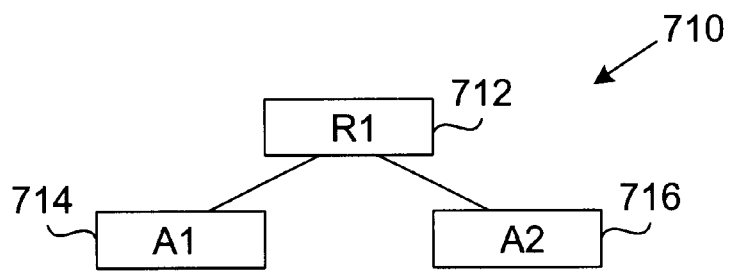
FIG. 7B is an exemplary block diagram illustrating the use of the class instances of FIG. 7A in a tree data structure.

One example of such a data structure is a tree data structure. FIG. 7B is an exemplary block diagram illustrating the use of the class instances of FIG. 7A in a tree data structure. As shown, a tree data structure 710 includes a root node 712 and two child nodes, 714 and 716. For instance, the first instance 702, object A1, may be the first child node 714 while the second instance 704, object A2, may be the second child node 716. Since memory accesses with respect to child nodes in a tree data structure are typically substantially similar, memory accesses with respect to instances of a single class may be generalized across the class in this instance.

Figure 7C:
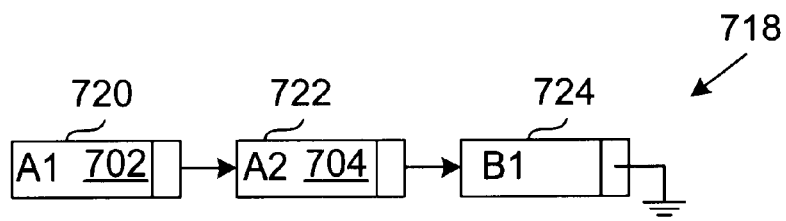
FIG. 7C is an exemplary block diagram illustrating the use of the class instances of FIG. 7A in a linked list data structure.

Another example of a data structure in which multiple instances of a single class are used is a linked list. FIG. 7C is an exemplary block diagram illustrating the use of the class instances of FIG. 7A in a linked list data structure. Linked list 718 is shown to include three objects: a first object 720, a second object 722, and a third object 724. As shown, the first object 720 in the linked list 718 may be the first instance 702 of class A. Similarly, the second object 722 in the linked list 718 may be the second instance 704 of class A. Memory accesses with respect to elements of a linked list are typically performed with substantially the same frequency, and therefore memory accesses with respect to instances of a single class may be generalized across the class.

Figure 8:
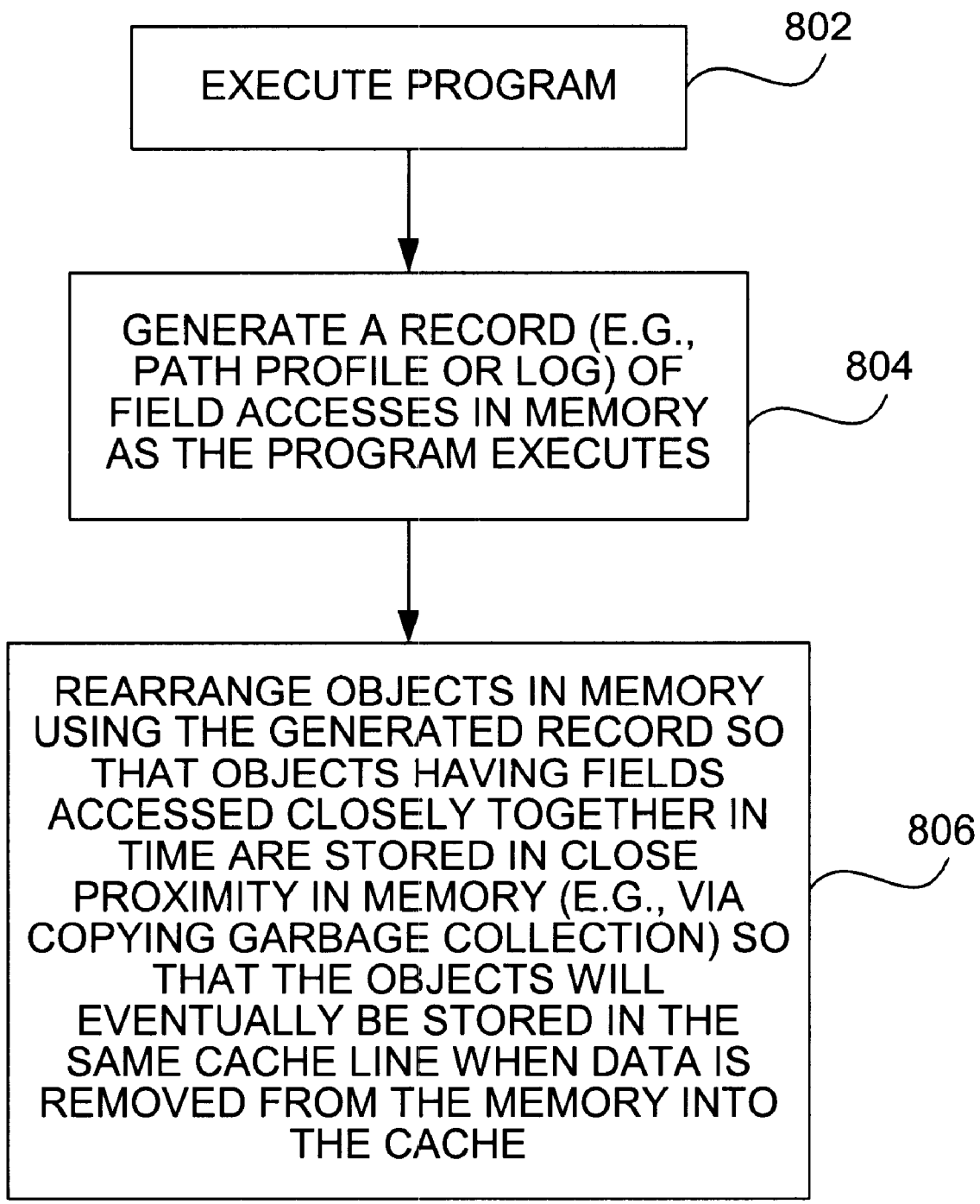
FIG. 8 is a process flow diagram illustrating a general process for rearranging objects in memory so that objects having fields accessed closely together in time are stored in close proximity in memory according to one embodiment of the invention.

FIG. 8 is a process flow diagram illustrating a general process for rearranging objects in memory so that objects having fields accessed closely together in time are stored in close proximity in memory according to one embodiment of the invention. A computer application is executed at block 802. As the computer application executes, a record of the field references (e.g., path profile or log of the field references) in memory is created as the computer application executes at block 804. Objects are then rearranged in memory using the generated record of the field references (e.g., path profile or log of the field references) at block 806. For instance, the objects may be rearranged during a copying garbage collection process. Upon completion of the above-described process, the objects are rearranged such that those objects having fields accessed closely together in time are stored in close proximity in memory. Thus, these objects will likely be stored in the same cache line when data is retrieved from the memory into the cache.

Figure 9:
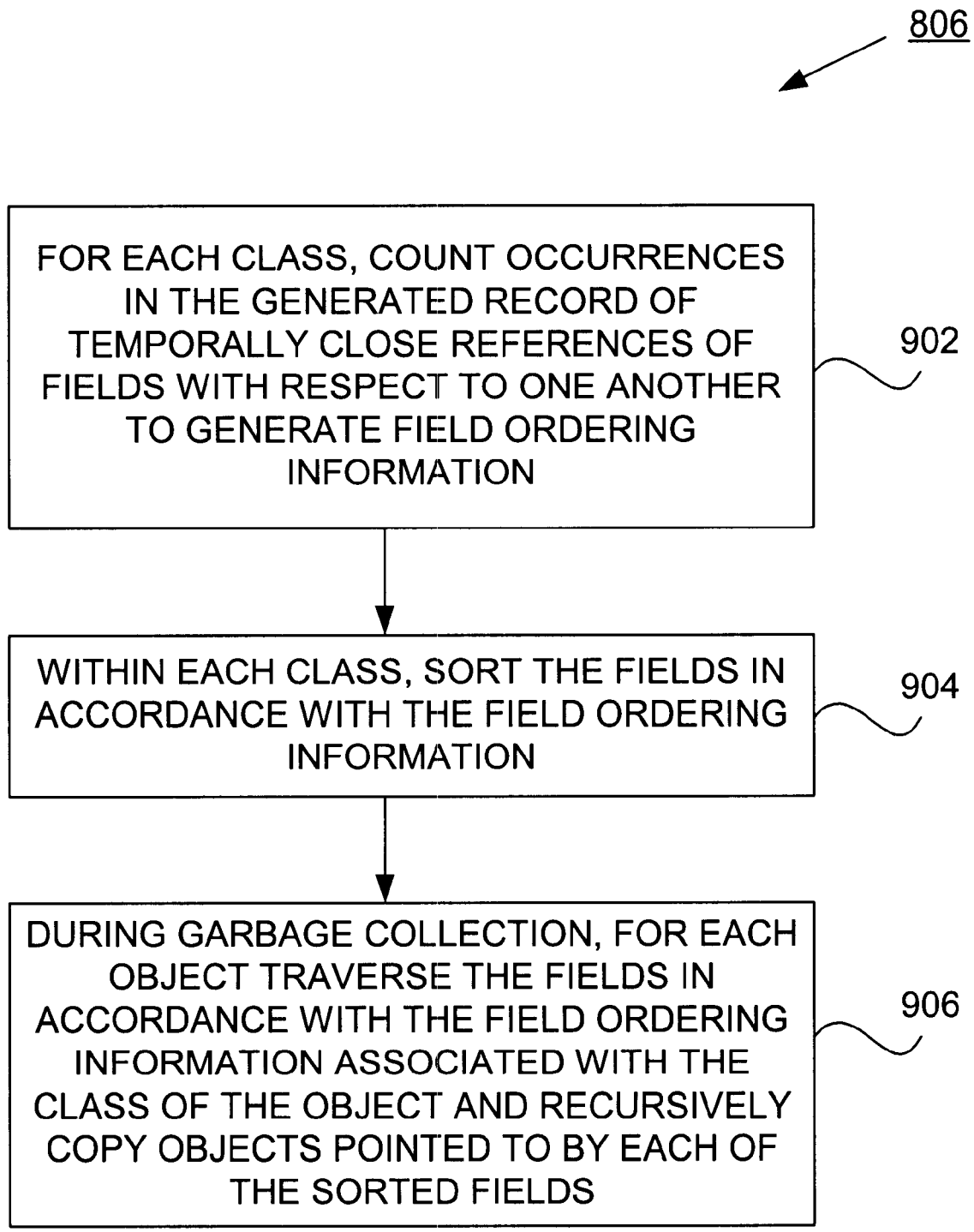
FIG. 9 is a process flow diagram illustrating a general method of rearranging the objects in memory as shown at block 806 of FIG. 8.

The objects may be rearranged in memory at block 806 using a variety of processes. According to one embodiment, the frequency and proximity in time of the field references as recorded at block 804 of FIG. 8 are generalized across all instances of a given class. FIG. 9 is a process flow diagram illustrating a general method of rearranging the objects in memory as shown at block 806 of FIG. 8. At block 902, for each class, occurrences in the record generated at block 804 of FIG. 8 of temporally close references of fields with respect to one another are counted for each field over all instances of the class to generate field ordering information. For instance, data that may be gathered to generate the field ordering information within a particular class may include the number of times each field is accessed, the time between the accesses of the data referenced by the field in relation to other fields of the same class, the number of instructions (or memory accesses) between the references of the field in relation to other fields of the same class, and the order in which the fields of the class are accessed. The fields are then sorted according to the field ordering information at block 904.

The objects traversed during garbage collection may be stored in a data structure such as a tree or directed graph. For instance, the objects may be copied in a depth first order. During copying collection, there must be some mechanism for determining which object or set of objects to copy next. In other words, there must be some mechanism for determining which pointer to traverse next. According to one embodiment, the field ordering information is used to determine the appropriate path to traverse within the data structure. Thus, during garbage collection, fields are scanned in the sorted order at block 906. When each field is "scanned", objects pointed to (directly or indirectly) by the field are copied. In other words, objects pointed to by the field and/or an associated object are copied. Accordingly, during garbage collection, for each object, the fields are traversed in accordance with the field ordering information associated with the class of the object, and objects pointed to (directly or indirectly) by each of the sorted fields are copied. For instance, the copying of objects may be performed in a depth-first manner.

Figure 10:
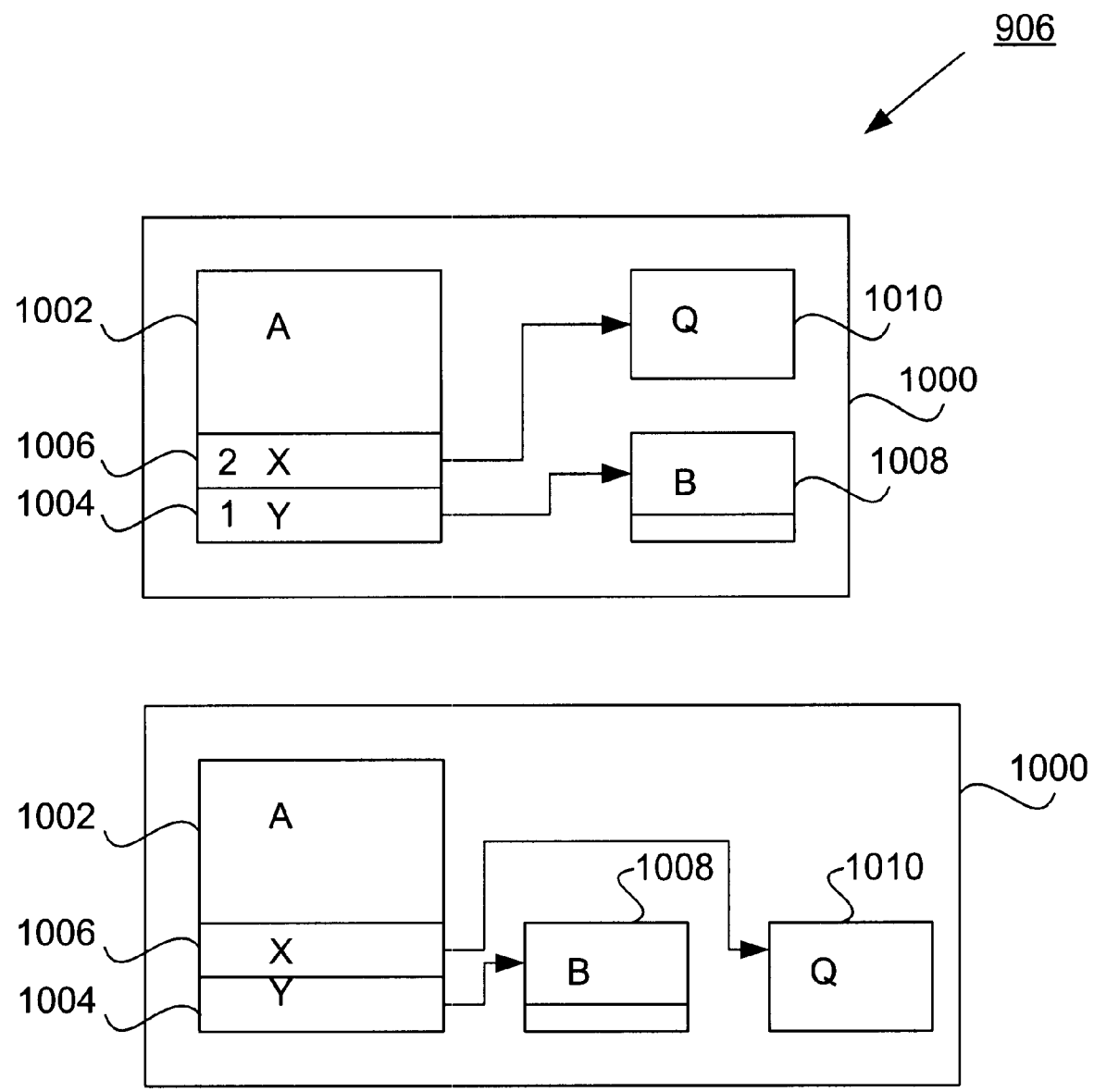
FIG. 10 is a diagram illustrating an exemplary set of objects upon completion of copying garbage collection as performed at block 906 of FIG. 9.

As described above, according to one embodiment, for objects having one or more fields, those fields are traversed according to field ordering information associated with the appropriate class during copying garbage collection. FIG. 10 is a diagram illustrating an exemplary set of objects and the placement in memory of those objects during copying garbage collection as performed at block 906 of FIG. 9. Prior to garbage collection, these objects are stored within a memory 1000. As shown, a first object 1002, A, has a first field 1004, y, and a second field 1006, x. The first field 1004, y, references a second object 1008, B, and the second field 1006, x, references a third object 1010, Q. In this example, when the total number of field references with respect to other fields within the same class are determined and the fields are sorted by the total number of field references, the data referenced by the first field 1004, y, is found to be referenced a greater number of times than the data referenced by the second field 1006, x. Thus, when copying garbage collection is performed, objects referenced by the first field 1004, y, are copied first. Objects referenced by the second field 1006, x, are then copied. Accordingly, as shown, the second object 1008, B, is copied first such that it is closest to the first object 1002, A, while the third object 1010, Q, is copied second.

Figure 11:
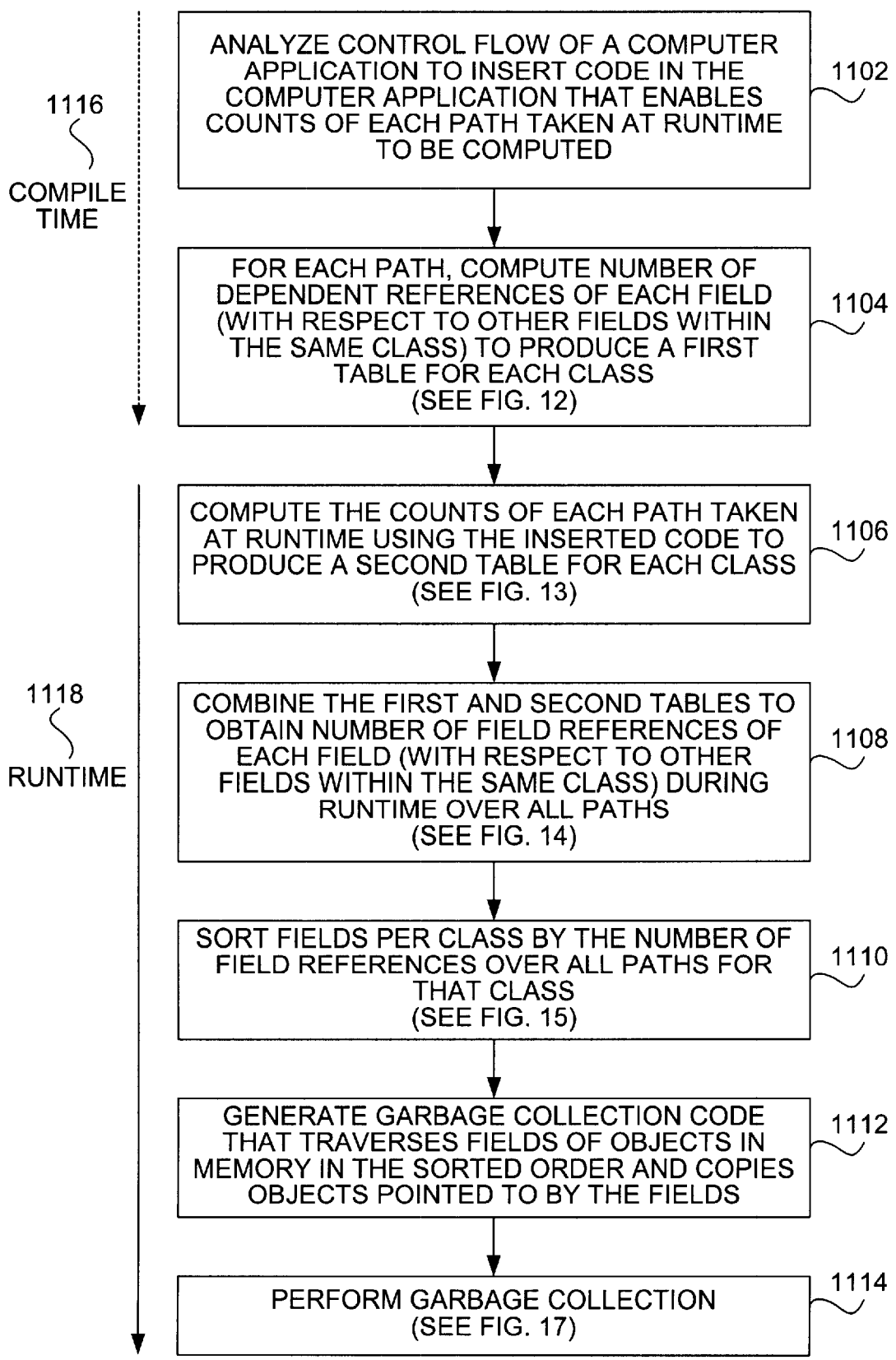
FIG. 11 is a process flow diagram illustrating a detailed method of rearranging objects in memory according to one embodiment of the invention.

A general method of rearranging objects has been described above with respect to FIG. 9 and FIG. 10. FIG. 11 is a process flow diagram illustrating a specific method of rearranging the objects in memory according to one embodiment of the invention. According to this embodiment, a path profile rather than a log is used in order to provide greater efficiency. Thus, at block 1102, the control flow of a computer application is analyzed to insert code in the computer application that enables counts of each path indicating the total number of times each path is taken at runtime to be computed. For each path, the number of dependent references of each field (with respect to other fields within the same class) are computed to produce a first table for each class at block 1104. An example of a first table will be shown and described in further detail with reference to FIG. 12. At block 1106, the counts of each path taken at runtime are then computed using the inserted code to produce a second table for each class. An exemplary second table will be shown and described in further detail with reference to FIG. 13. The first and second tables are then combined at block 1108 to obtain the number of field references of each field (with respect to other fields within the same class) during runtime over all paths. The result of combining the first and second tables will be described in further detail with reference to FIG. 14. The fields are then sorted per class by the number of field references over all paths for that class at block 1110. The result of such a sorting process will be shown and described in further detail with reference to FIG. 15. Garbage collection code that traverses fields of objects in memory in the sorted order and copies objects pointed to by the fields is then generated at block 1112. Garbage collection is then performed at block 1114. A more detailed method of performing garbage collection using the generated garbage collection code (or another mechanism) will be described in further detail with reference to FIG. 17.

As shown in the embodiment illustrated in FIG. 11, blocks 1102–1104 are performed during compile time 1116 while blocks 1106–1114 are performed during runtime. However, it is important to recognize that compilation is performed during runtime in Java. Thus, the above description is merely illustrative and the steps need not be performed during separate compile and execution processes.

Figure 12:
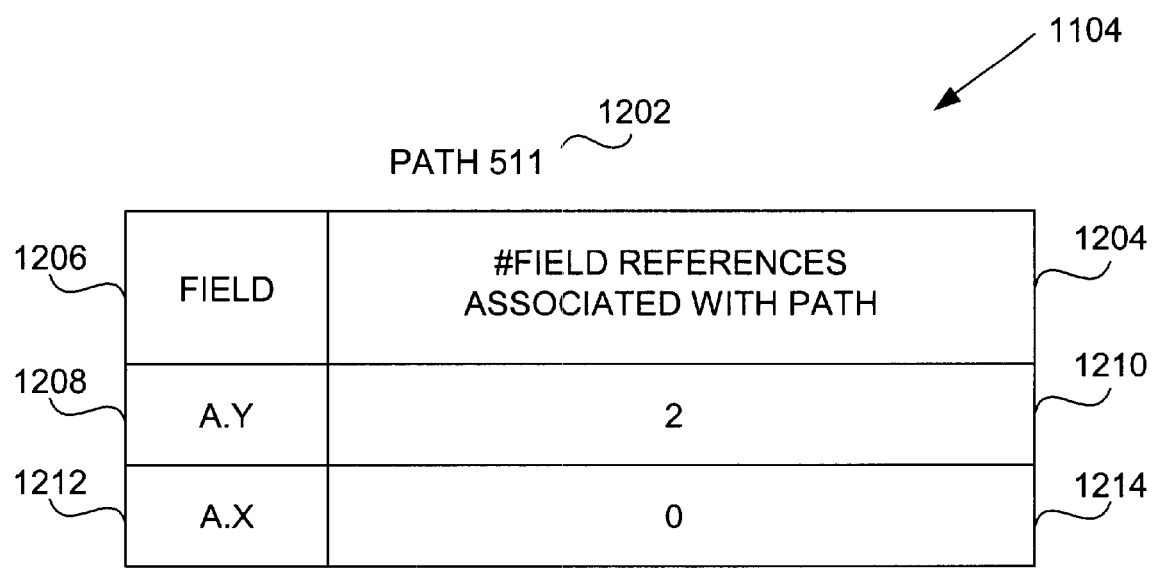
FIG. 12 is a block diagram illustrating an exemplary first table as produced at block 1104 of FIG. 11.

As described above with reference to block 1104 of FIG. 11, the number of dependent references (i.e., memory accesses) of each field (with respect to other fields within the same class) are computed to produce a first table for each class over each path. FIG. 12 is a block diagram illustrating an exemplary first table as produced at block 1104 of FIG. 11. As shown, for a particular path 1202 (e.g., path 511), the number of field references associated with that path 1204 for each field 1206 within a particular class (with respect to other fields within the same class) are presented in table format. For instance, for field y 1208 within class A, the number of field references 1208 (with respect to field x) associated with path 511 is shown to be 2 at 1210. Similarly, for field x 1212 within class A, the number of field references 1214 (with respect to field y) associated with path 511 is shown to be zero. It is important to note that the number of field references is not merely the number of times that field is referenced, but also includes field ordering information. As one example, the number of field references 1204 may specify the number of times that a particular field is referenced (i.e., accessed from memory) immediately after another field within the same class. As another example, the number of field references 1204 may specify the number of times that a particular field is referenced immediately before another field within the same class. Other examples include counting the number of times a particular field is referenced after/before each other field within the same class so that multiple counts are compiled for a single field. In this manner, field ordering information may ultimately be compiled.

Figure 13:
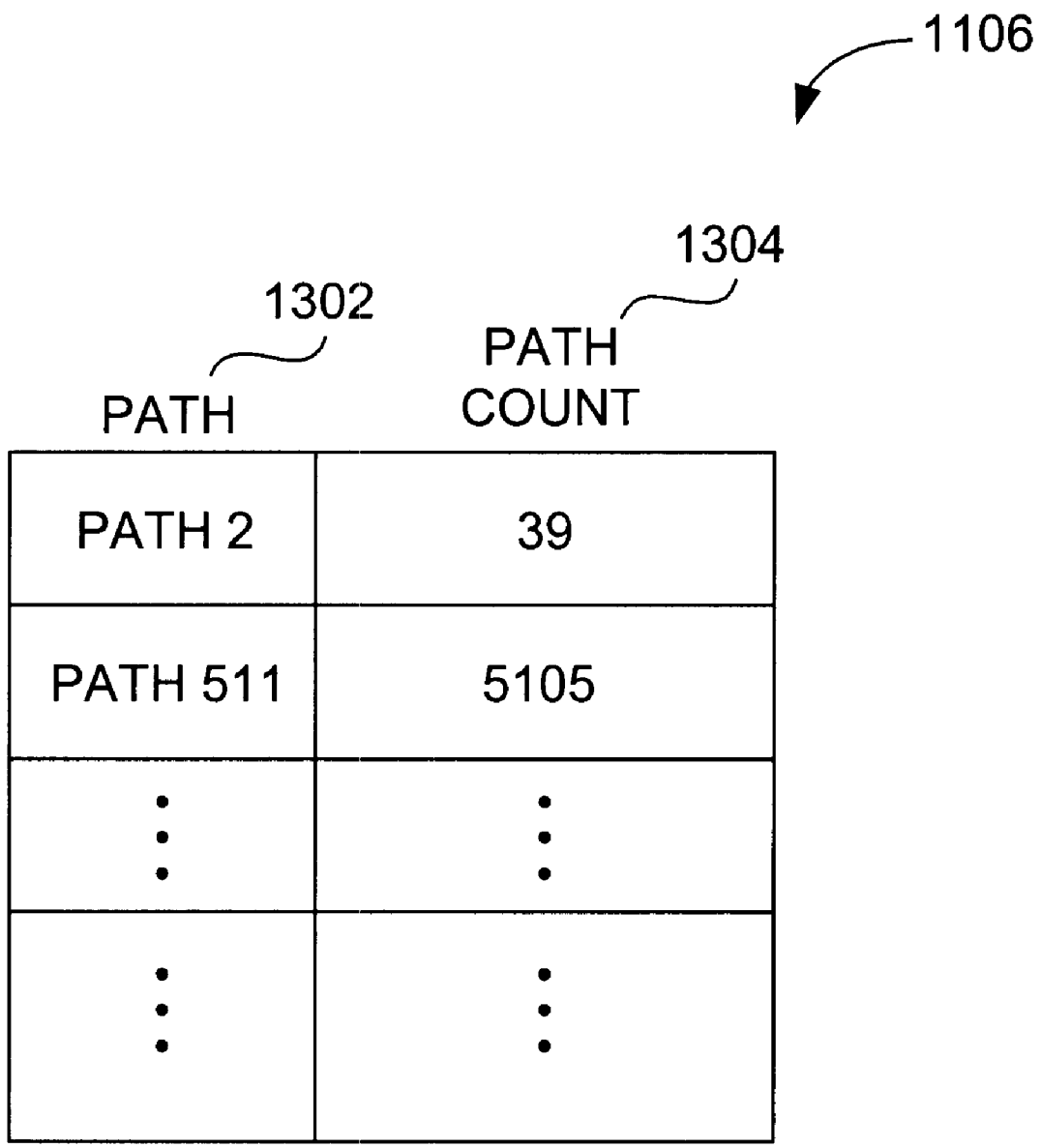
FIG. 13 is a block diagram illustrating an exemplary second table as produced at block 1106 of FIG. 11.

Similarly, as described above with respect to block 1106 of FIG. 11, the number of times each path is traversed during runtime is counted. FIG. 13 is a block diagram illustrating an exemplary second table as produced at block 1106 of FIG. 11. As shown, the second table identifies each path 1302 and associated path count 1304 indicating the number of times the identified path 1302 is traversed during execution of the computer application.

Figure 14:
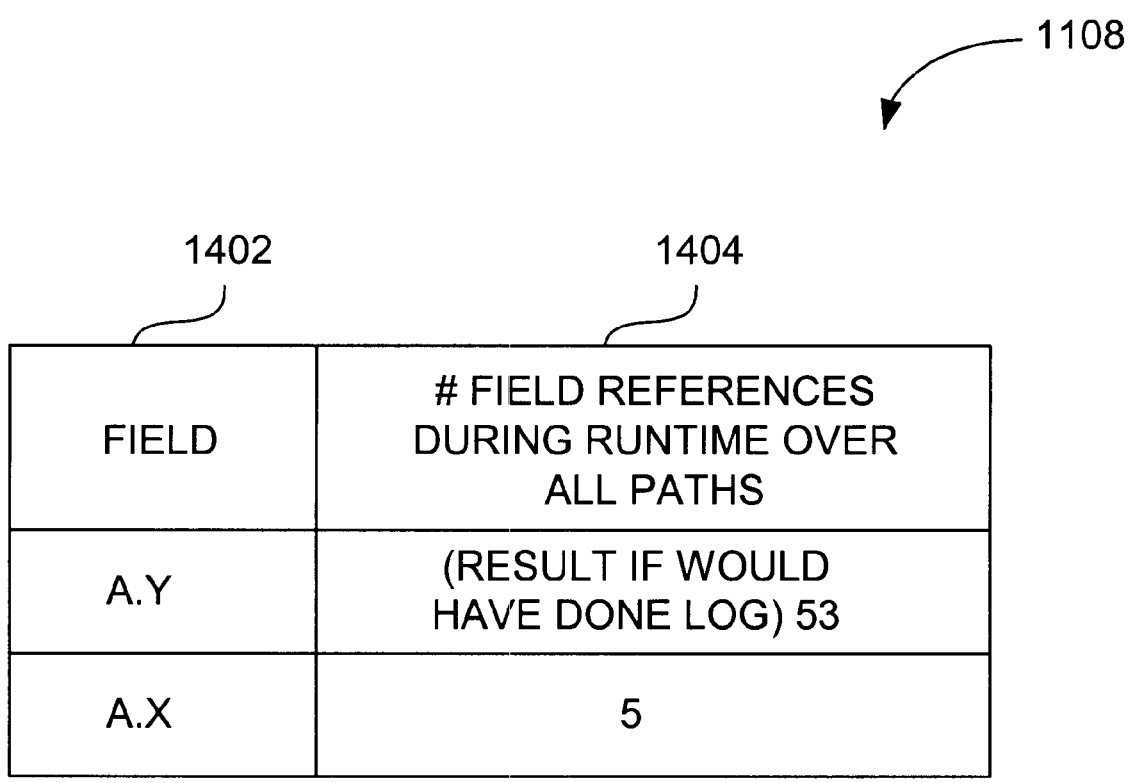
FIG. 14 is a block diagram illustrating an exemplary third table produced at block 1108 of FIG. 11 from tables such as those illustrated in FIG. 12 and FIG. 13.

Once first and second tables such as those illustrated in FIG. 12 and FIG. 13 are created, the tables are combined, as described above with reference to block 1108 of FIG. 11. FIG. 14 is a block diagram illustrating an exemplary third table produced at block 1108 of FIG. 11 from tables such as those illustrated in FIG. 12 and FIG. 13. When both tables are combined, for each field 1402 within a particular class, the number of references 1404 of that field with respect to other fields of the same class are determined. For instance, as shown, for field y of class A, the number of field references during runtime over all paths with respect to field x of class A is 53. In other words, this result should be equivalent to the result that would be obtained if a log were created rather than a path profile. Similarly, as shown, for field x of class A, the number of field references during runtime over all paths with respect to field y of class A is 5.

As described above, the number of field references implies some ordering information of the associated field with respect to other fields of the same class.

Figure 15:
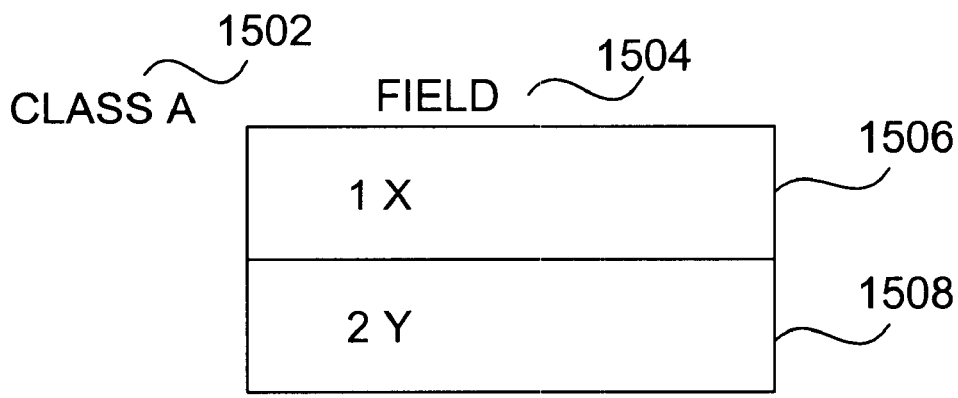
FIG. 15 is an exemplary block diagram illustrating the result of sorting fields as shown at block 1110 of FIG. 11.
Figure 15:
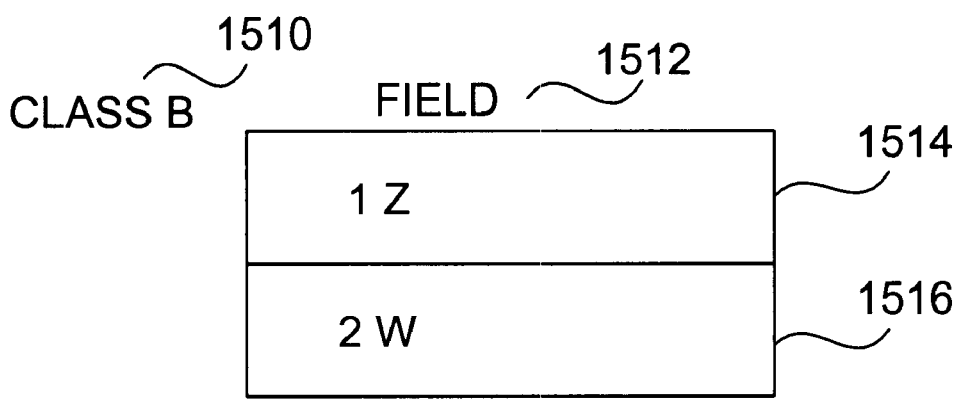

Once the fields of each class are sorted, field ordering information is associated with the fields of each class. FIG. 15 is an exemplary block diagram illustrating the result of sorting fields as shown at block 1110 of FIG. 11. For example, for class A 1502, each field 1504 is sorted. As a result, field x 1506 is to be traversed first during copying garbage collection, while field y 1508 is to be traversed second during copying garbage collection. Similarly, for class B 1510, each field 1512 is sorted. As a result, field z 1514 is to be traversed first during copying garbage collection, while field w 1516 is to be traversed second during copying garbage collection.

Figure 16:
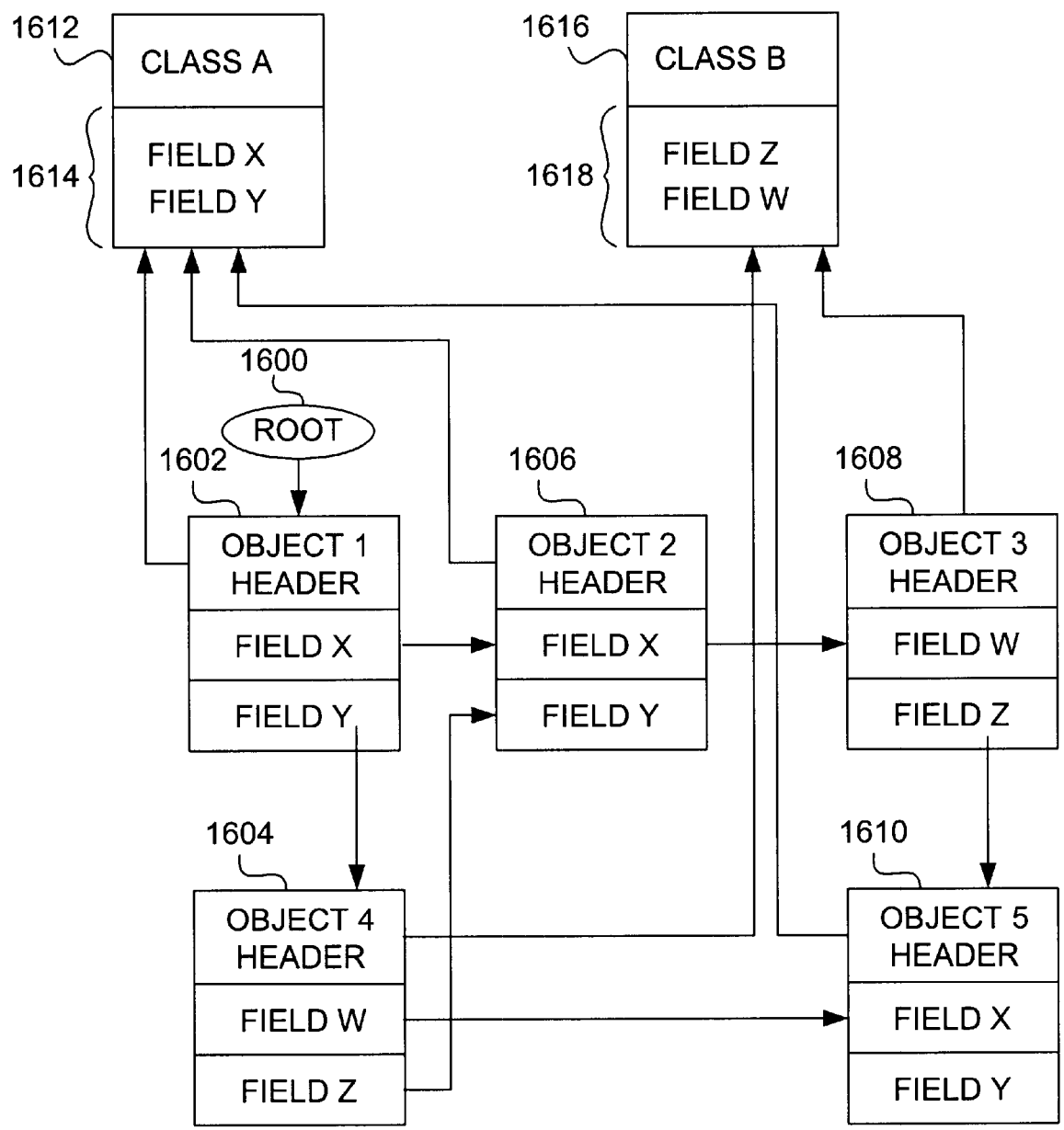
FIG. 16 is an exemplary data structure which may be traversed during a garbage collection process.

The objects copied during the garbage collection process may be stored in a data structure such as a tree or directed graph. FIG. 16 is an exemplary data structure which may be traversed during a garbage collection process. As shown, the garbage collection process starts from a root node or root pointer 1600. For example, the root pointer 1600 may be obtained from a stack or may be a static variable. The root pointer points to a first object 1602. As shown, each object 1602, 1604, 1606, 1608, and 1610 has an object header that is linked to (i.e., points to) the field order of the class associated with the object. For instance, as shown, the first object 1602 is linked to class A 1612. In the description of each class, a list of offsets (not shown to simplify illustration), each of which is associated with a particular field, is typically stored. Moreover, each class has an associated field order for the fields of that class which identify the order in which the fields of associated objects are to be traversed during a garbage collection process such as copying garbage collection. For instance, the field order 1614 for the class A 1612 may specify that field x is to be traversed prior to field y. Similarly, as shown in FIG. 16, the fourth object 1604 and the third object 1608 are both linked to class B 1616. Class B 1616 has an associated field order 1618, which specifies that field z is to be traversed before field w. Thus, with respect to the fourth object 1604, for example, the second object 1606 pointed to by the field z is to be traversed and therefore copied prior to the fifth object 1610 pointed to by the field w.

Figure 17:
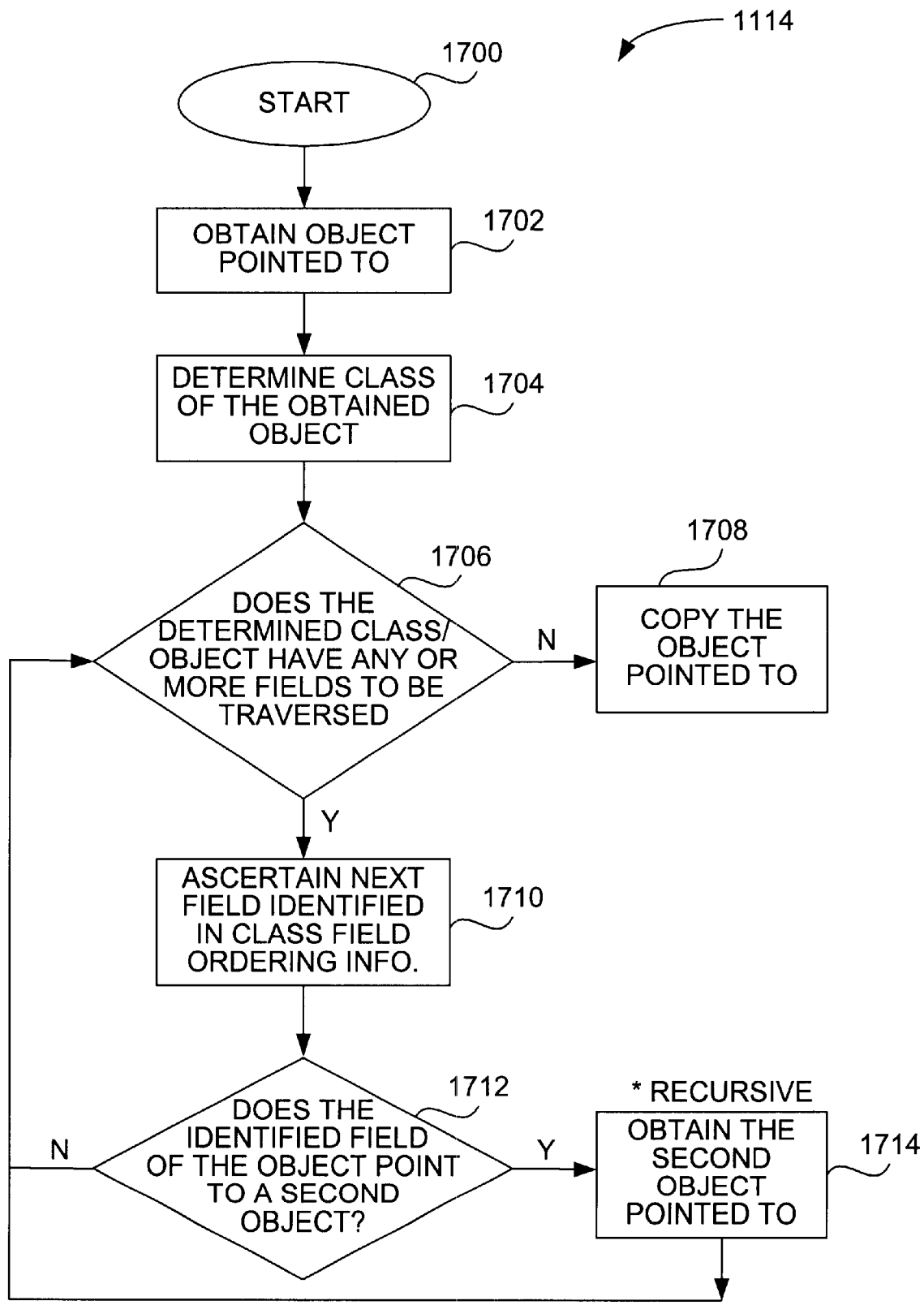
FIG. 17 is a process flow diagram illustrating one method of performing garbage collection as shown at block 1114 of FIG. 14 using the result of a sorting process such as that shown in FIG. 15 and a data structure of objects such as that shown in FIG. 16.

As described above with reference to block 1114 of FIG. 11, the garbage collection process is performed using the field ordering information associated with each associated class. More particularly, for each object copied during garbage collection (e.g., copying collection), the class of the object is determined and the fields of the objects are visited during copying collection in accordance with the field ordering information associated with the class of the object. FIG. 17 is a process flow diagram illustrating one method of performing garbage collection as shown at block 1114 of FIG. 1114 using the result of a sorting process such as that shown in FIG. 15 and a data structure of objects such as that shown in FIG. 16. The process begins at block 1700. For instance, as described above, the process may start at a root node or root pointer. The object pointed to by the current pointer (e.g., root pointer) is then obtained at block 1702. The class of the obtained object is then determined at block 1704. For instance, the header of an object may point to the class, as shown in FIG. 16. Thus, the class of the object may be ascertained by following the pointer from the object header to the associated class. Next, it is determined whether the class/object has any (or further) fields to be traversed at block 1706.

If the object does not have any or any/more fields to traverse, the object is copied at block 1708. Otherwise, the next field identified in the class field ordering information is ascertained at block 1710. For instance, in the description of the class, a list of offsets associated with the fields of that class is typically included. The offset for the next identified field may be obtained from this description in order to locate the field of the obtained object.

It is next determined whether the identified field of the object points to a second object at block 1712. If it does, the second object is obtained (e.g., through a recursive process) at block 1714. If the identified field of the object does not point to a second object, the process continues at block 1706 for any further fields associated with that object. When the process is performed recursively, each object in the data structure being traversed will ultimately be copied at block 1708.

Figure 18:
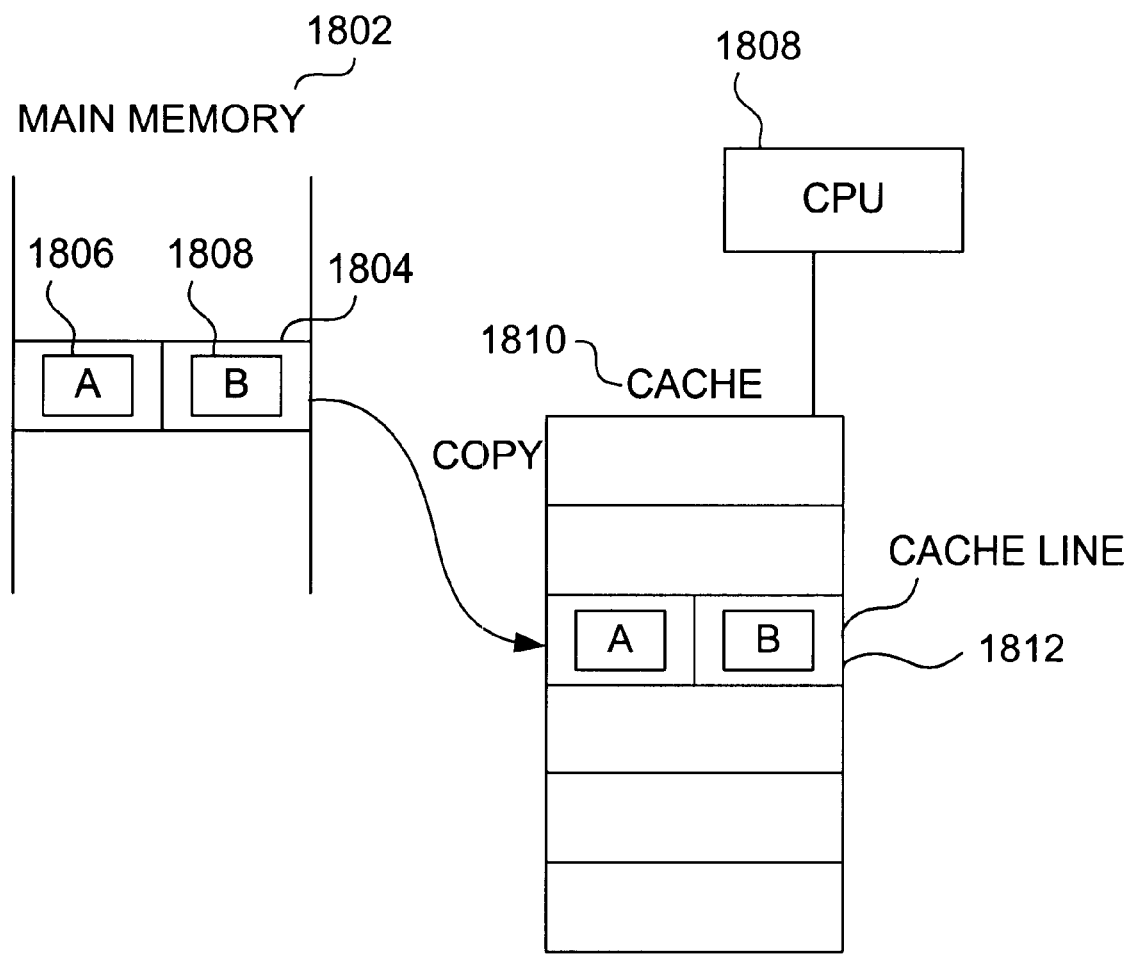
FIG. 18 is diagram illustrating the use of the present invention to achieve the storage of objects in memory to facilitate the efficient access of the objects in a cache.

The present invention may be used to store objects in memory to maximize the probability that those objects having fields accessed in close proximity to one another will also be stored in close proximity. FIG. 18 is diagram illustrating the use of the present invention to achieve an optimal configuration of the objects in memory. As shown, a main memory 1802 stores objects within a block of data 1804. For instance, each block of data may be 32 bytes. Through the use of the present invention, a first object 1806, A, and a second object 1808, B, may be stored within a single block of data 1804 within the main memory 1802. When a CPU 1808 copies this block of data 1804 into a cache 1810, the objects 1806 and 1808 may then be stored in the same cache line 1812 (or in a set of cache lines). Accordingly, through the use of the present invention, the efficient access of objects having fields accessed in close proximity to one another may be achieved by enabling the objects to be stored simultaneously within a cache when a single block of data is retrieved from the main memory 1802.

Rather than gathering locality information per object, the present invention gathers locality information per class and therefore distinguishes between the type of objects and fields. In other words, it exploits the observation that instances of a given class are likely to have similar load dependencies. This is accomplished, according to one embodiment, through path profiling and a mechanism for dynamically changing the order in which fields of a given class are visited during copying collection.

Figure 19:
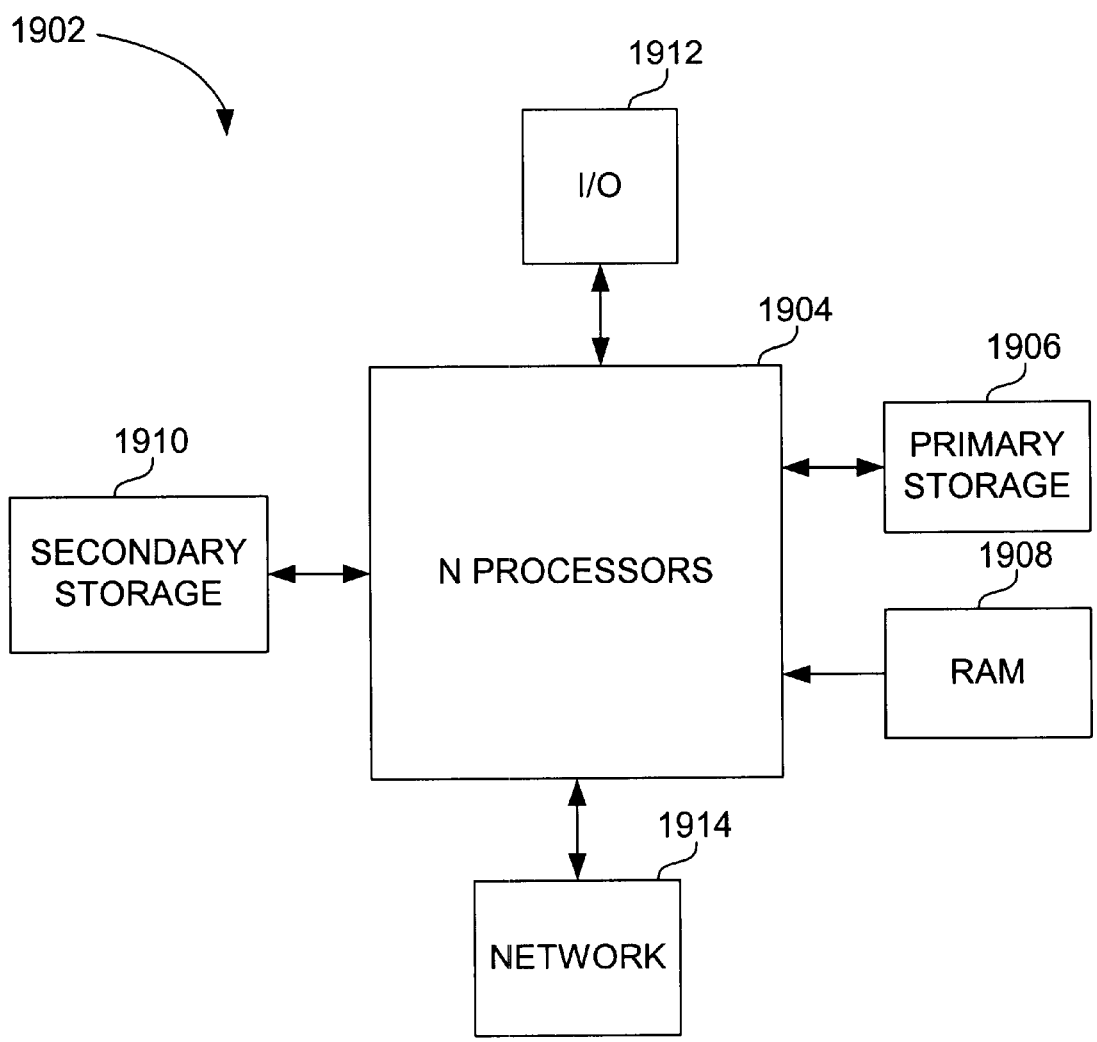
FIG. 19 is a block diagram illustrating a typical, general-purpose computer system suitable for implementing the present invention.

The present invention may be implemented on any suitable computer system. FIG. 19 illustrates a typical, general-purpose computer system 1902 suitable for implementing the present invention. The computer system may take any suitable form. For example, the computer system may be integrated with a digital television receiver or set top box.

Computer system 1930 or, more specifically, CPUs 1932, may be arranged to support a virtual machine, as will be appreciated by those skilled in the art. The computer system 1902 includes any number of processors 1904 (also referred to as central processing units, or CPUs) that may be coupled to memory devices including primary storage device 1906 (typically a read only memory, or ROM) and primary storage device 1908 (typically a random access memory, or RAM). As is well known in the art, ROM acts to transfer data and instructions uni-directionally to the CPUs 1904, while RAM is used typically to transfer data and instructions in a bi-directional manner. Both the primary storage devices 1906, 1908 may include any suitable computer-readable media. The CPUs 1904 may generally include any number of processors.

A secondary storage medium 1910, which is typically a mass memory device, may also be coupled bi-directionally to CPUs 1904 and provides additional data storage capacity. The mass memory device 1910 is a computer-readable medium that may be used to store programs including computer code, data, and the like. Typically, the mass memory device 1910 is a storage medium such as a hard disk which is generally slower than primary storage devices 1906, 1908.

The CPUs 1904 may also be coupled to one or more input/output devices 1912 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1904 optionally may be coupled to a computer or telecommunications network, e.g., an internet network or an intranet network, using a network connection as shown generally at 1914. With such a network connection, it is contemplated that the CPUs 1904 might receive information from the network, or might output information to the network in the course of performing the above-described method steps. Such information, which is often represented as a sequence of instructions to be executed using the CPUs 1904, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented within the context of a digital television receiver. However, the present invention may be used in other contexts. Moreover, although the present invention is described as being implemented on a Java™ platform, it may also be implemented on a variety of platforms. Moreover, the above described process blocks are illustrative only. Therefore, the implementation of the present invention may be performed using alternate process blocks as well as alternate data structures. Accordingly, the present embodiments are to be considered as illustrative and not restrictive, and the invention is not to be limited to the details given herein, but may be modified within the scope and equivalents of the appended claims.

What is claimed is:

1. A method of creating a mechanism for rearranging a plurality of objects in memory, the plurality of objects being associated with one or more classes, the method comprising:
    ascertaining a number of accesses in memory of data referenced by fields associated with a selected one of the one or more classes with respect to data referenced by remaining ones of the fields associated with the selected one of the one or more classes;
    determining a class field order associated with the selected one of the one or more classes from the associated number of accesses, the class field order identifying an order in which fields of the selected one of the one or more classes are to be traversed during garbage collection;
    repeating the ascertaining and determining steps for each one of the one or more classes;
    generating a record of the accesses in memory of the fields associated with the one or more classes during execution of a computer application;
    inserting computer code in the computer application that enables counts indicating a total number of times each path is taken during execution of the computer application to be computed;
    determining a number of references of each field with respect to other fields within the same one of the classes for each said path;
    employing the inserted computer code to compute the counts of each said path taken during execution of the computer application; and
    combining the determined number of references of each field with respect to other fields within the same one of the classes for each said path with the computed counts of each said path taken during execution of the computer application to determine the class field order for the associated class.

2. The method as recited in claim 1, further comprising:
    sorting the fields associated with each class in accordance with the associated class field order.

3. The method as recited in claim 1, wherein the number of accesses indicates a frequency and proximity of accesses in memory of data referenced by the fields.

4. The method as recited in claim 1, wherein the number of accesses specifies a number of times that each of the fields of the selected class is referenced immediately after another field within the selected class.

5. The method as recited in claim 1, wherein the number of accesses specifies a number of times that each of the fields of the selected class is referenced immediately before another field within the selected class.

6. The method as recited in claim 1, wherein the number of accesses specifies a number of times that each of the fields of the selected class is referenced after another field within the selected class.

7. The method as recited in claim 6, wherein the number of accesses specifies a number of times that each of the fields of the selected class is referenced before another field within the selected class.

8. The method as recited in claim 1, wherein ascertaining a number of accesses in memory of fields associated with the selected class comprises:
    counting a number of times that one of the fields of the selected class is referenced in relation to each other one of the fields of the selected class such that one or more counts are generated for the one of the fields;
    repeating the counting step for each one of the fields associated with the selected class; and
    generating the class field order from the one or more counts associated with each one of the fields.

9. The method as recited in claim 1, wherein generating a record of the accesses in memory of the fields associated with the one or more classes comprises generating a log of the accesses in memory during execution of the computer application.

10. The method as recited in claim 1, wherein generating a record of the accesses in memory of the fields associated with the one or more classes comprises performing path profiling.

11. The method as recited in claim 1, further comprising:
    rearranging the plurality of objects in the memory in accordance with the class field order associated with the one or more classes.

12. The method as recited in claim 11, wherein rearranging is performed during a garbage collection process.

13. The method as recited in claim 12, wherein the garbage collection process is a copying garbage collection process.

14. The method as recited in claim 1, further comprising:
generating garbage collection code that traverses fields of objects in memory according to the class field order of the associated class.

15. The method as recited in claim 14, wherein the generated garbage collection code determines a class of an object and visits the fields of the objects during copying collection in accordance with the class field order of the class of the object.

16. A computer-readable medium for creating a mechanism for rearranging a plurality of objects in memory, the plurality of objects being associated with one or more classes, the computer-readable medium comprising:
computer instructions for ascertaining a frequency of accesses in memory of fields associated with a selected one of the one or more classes with respect to remaining ones of the fields associated with the selected one of the one or more classes;
computer instructions for determining a class field order associated with the selected one of the one or more classes from the associated frequency of accesses in memory of the fields, the class field order identifying an order in which fields of the selected one of the one or more classes are to be traversed during garbage collection;
computer instructions for repeating the ascertaining and determining steps for each one of the one or more classes;
computer instructions for generating a record of the accesses in memory of the fields associated with the one or more classes during execution of a computer application;
computer instructions for inserting computer code in the computer application that enables counts indicating a total number of times each path is taken during execution of the computer application to be computed;
computer instructions for determining a number of references of each field with respect to other fields within the same one of the classes for each said path;
computer instructions for employing the inserted computer code to compute the counts of each said path taken during execution of the computer application; and
computer instructions for combining the determined number of references of each field with respect to other fields within the same one of the classes for each said path with the computed counts of each said path taken during execution of the computer application to determine the class field order for the associated class.

17. The computer-readable medium as recited in claim 16, further comprising:
computer instructions for generating garbage collection code that traverses fields of objects in memory according to the class field order of the associated class.

18. A system for creating a mechanism for rearranging a plurality of objects in memory, the plurality of objects being associated with one or more classes, the computer-readable medium comprising:
a processor; and
a memory storing therein:
computer instructions for ascertaining a frequency of accesses in memory of fields associated with a selected one of the one or more classes with respect to remaining ones of the fields associated with the selected one of the one or more classes;
computer instructions for determining a class field order associated with the selected one of the one or more classes from the associated frequency of accesses in memory of the fields, the class field order identifying an order in which fields of the selected one of the one or more classes are to be traversed during garbage collection;
computer instructions for repeating the ascertaining and determining steps for each one of the one or more classes; and
computer instructions for generating a record of the accesses in memory of the fields associated with the one or more classes during execution of a computer application;
computer instructions for inserting computer code in the computer application that enables counts indicating a total number of times each path is taken during execution of the computer application to be computed;
computer instructions for determining a number of references of each field with respect to other fields within the same one of the classes for each said path;
computer instructions for employing the inserted computer code to compute the counts of each said path taken during execution of the computer application; and
computer instructions for combining the determined number of references of each field with respect to other fields within the same one of the classes for each said path with the computed counts of each said path taken during execution of the computer application to determine the class field order for the associated class.

19. The system as recited in claim 18, wherein the memory further comprises:
computer instructions for generating garbage collection code that traverses fields of objects in memory according to the class field order of the associated class.

20. The system as recited in claim 18, wherein the system is implemented on a Java platform.

21. An apparatus of creating a mechanism for rearranging a plurality of objects in memory, the plurality of objects being associated with one or more classes, comprising:
means for ascertaining a number of accesses in memory of data referenced by fields associated with a selected one of the one or more classes with respect to data referenced by remaining ones of the fields associated with the selected one of the one or more classes;
means for determining a class field order associated with the selected one of the one or more classes from the associated number of accesses, the class field order identifying an order in which fields of the selected one of the one or more classes are to be traversed during garbage collection;
means for repeating the ascertaining and determining steps for each one of the one or more classes;
means for generating a record of the accesses in memory of the fields associated with the one or more classes during execution of a computer application;
means for inserting computer code in the computer application that enables counts indicating a total number of times each path is taken during execution of the computer application to be computed;
means for determining a number of references of each field with respect to other fields within the same one of the classes for each said path;

means for employing the inserted computer code to compute the counts of each said path taken during execution of the computer application; and means for combining the determined number of references of each field with respect to other fields within the same one of the classes for each said path with the computed counts of each said path taken during execution of the computer application to determine the class field order for the associated class.

22. The apparatus as recited in claim 21, further comprising:

means for sorting the fields associated with each class in accordance with the associated class field order.

23. The apparatus as recited in claim 21, wherein the number of accesses indicates a frequency and proximity of accesses in memory of data referenced by the fields.

24. An apparatus of creating a mechanism for rearranging a plurality of objects in memory, the plurality of objects being associated with one or more classes, comprising:

a processor; and a memory, at least one of the processor and the memory being adapted for:

ascertaining a number of accesses in memory of data referenced by fields associated with a selected one of the one or more classes with respect to data referenced by remaining ones of the fields associated with the selected one of the one or more classes;

determining a class field order associated with the selected one of the one or more classes from the associated number of accesses, the class field order identifying an order in which fields of the selected one of the one or more classes are to be traversed during garbage collection;

repeating the ascertaining and determining steps for each one of the one or more classes;

generating a record of the accesses in memory of the fields associated with the one or more classes during execution of a computer application;

inserting computer code in the computer application that enables counts indicating a total number of times each path is taken during execution of the computer application to be computed;

determining a number of references of each field with respect to other fields within the same one of the classes for each said path;

employing the inserted computer code to compute the counts of each said path taken during execution of the computer application; and combining the determined number of references of each field with respect to other fields within the same one of the classes for each said path with the computed counts of each said path taken during execution of the computer application to determine the class field order for the associated class.

25. The apparatus as recited in claim 24, wherein at least one of the processor and the memory are further adapted for:

sorting the fields associated with each class in accordance with the associated class field order.

26. The apparatus as recited in claim 24, wherein the number of accesses indicates a frequency and proximity of accesses in memory of data referenced by the fields.

* * * * *